Feb. 15, 1944.  H. L. SCHANSTRA  2,342,014
TURN-OVER DEVICE
Filed Nov. 5, 1941  4 Sheets-Sheet 1

INVENTOR.
HENDRICK L. SCHANSTRA.
BY Barnes, Kisselle, Laughlin & Raisch
ATTORNEYS.

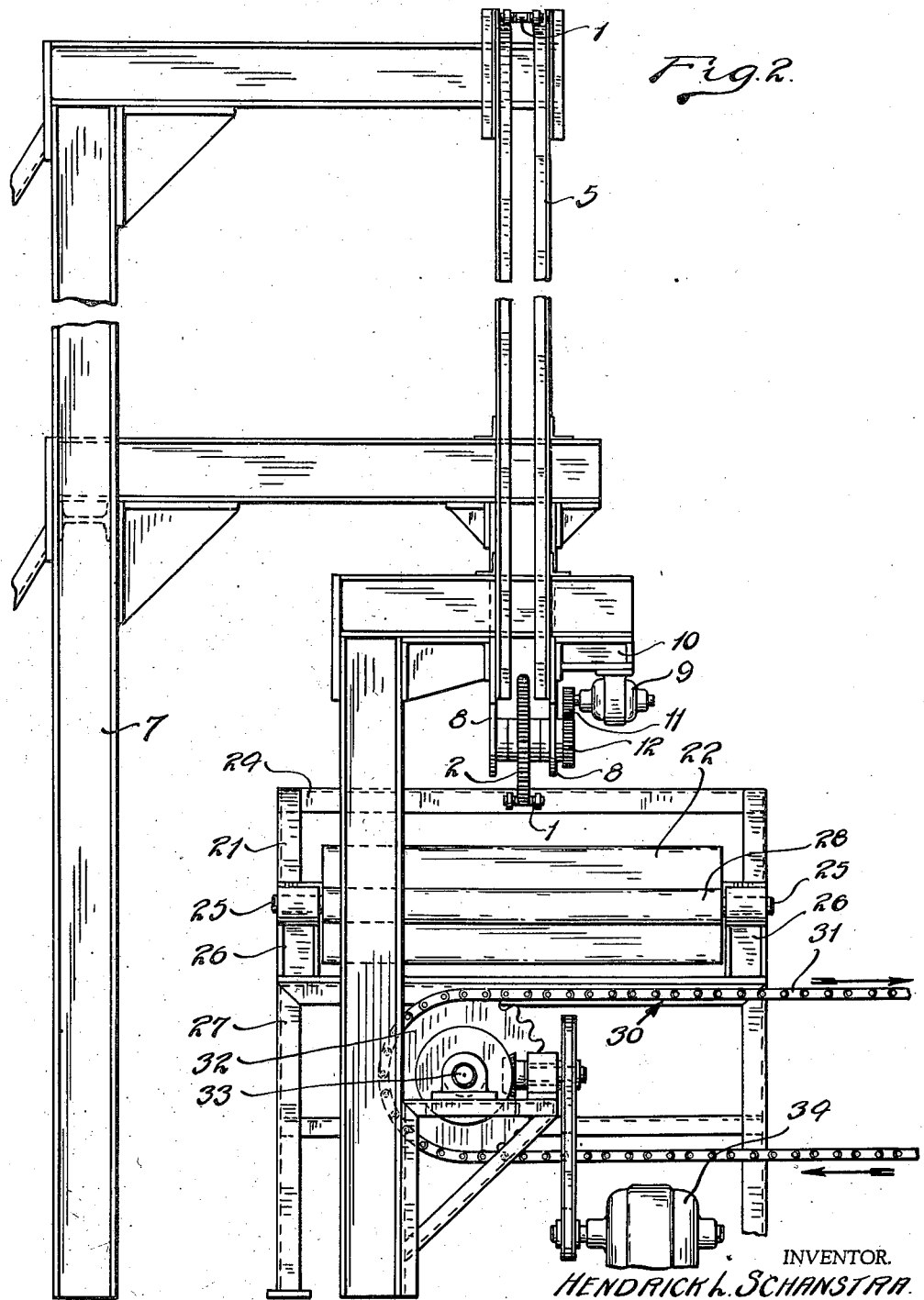

Feb. 15, 1944.   H. L. SCHANSTRA   2,342,014
TURN-OVER DEVICE
Filed Nov. 5, 1941     4 Sheets-Sheet 3

INVENTOR.
HENDRICK L. SCHANSTRA.
BY
Barnes, Kisselle, Laughlin & Raisch
ATTORNEYS.

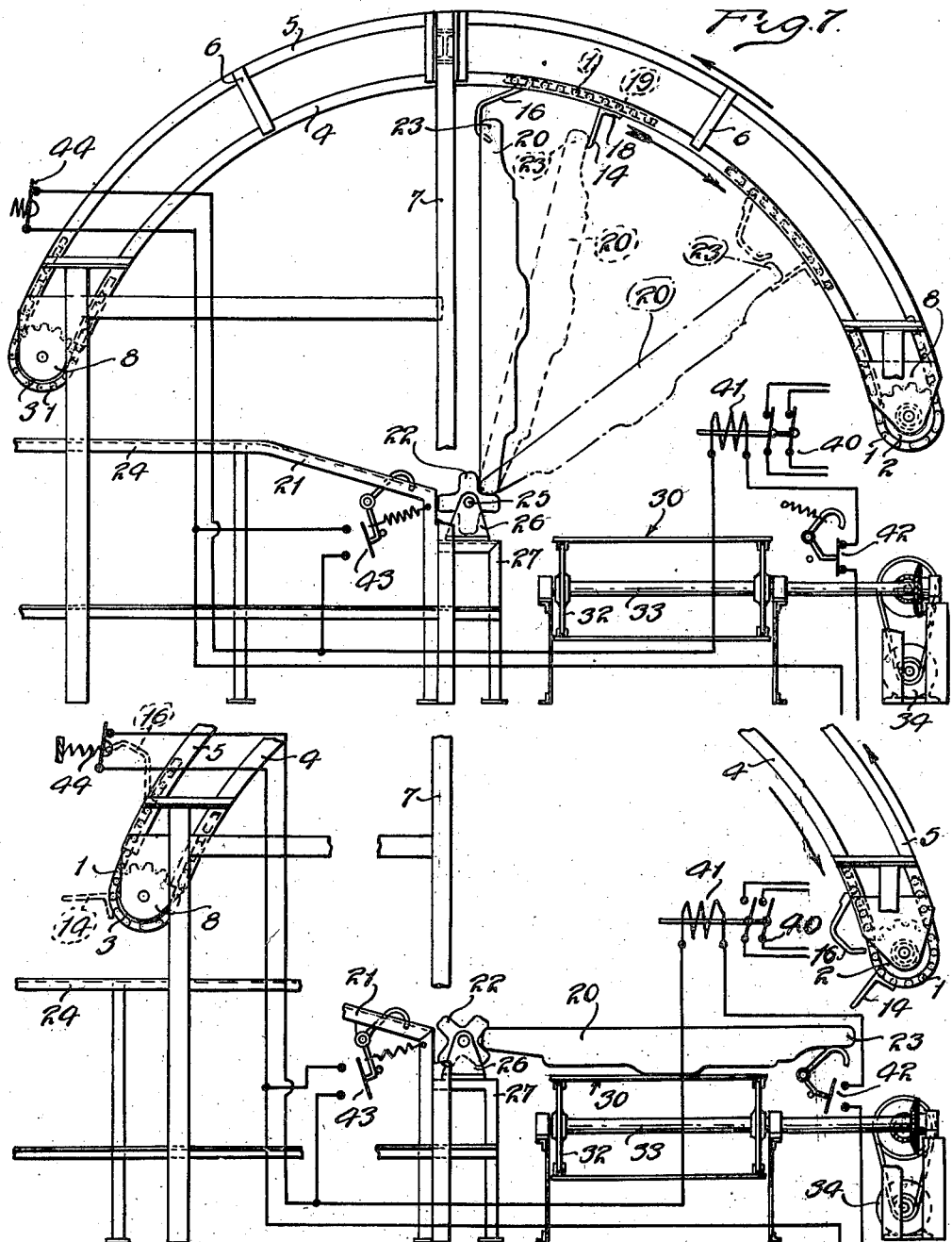

Patented Feb. 15, 1944

2,342,014

UNITED STATES PATENT OFFICE 2,342,014

TURNOVER DEVICE

Hendrick L. Schanstra, Hazel Park, Mich., assignor to General Motors Corporation, Detroit, Mich., a corporation of Delaware Application November 5, 1941, Serial No. 417,873

8 Claims. (Cl. 214—1)

This invention relates to a turn-over device and in particular a turn-over device for turning over sheet metal articles such as the floor pan for a automobile body.

This invention contemplates a turn-over device for turning over items such as the floor pan of an automobile body which is compact and simple in structure and efficient and automatic in operation.

The turn-over device is also one that as a unit is readily adapted for insertion in any production line wherein sheet metal stampings and other similar items must be turned over efficiently and without damaging the work item.

In the drawings:

Fig. 2 is an end elevation along the line 2—2 of Fig. 1.

Figure 1:
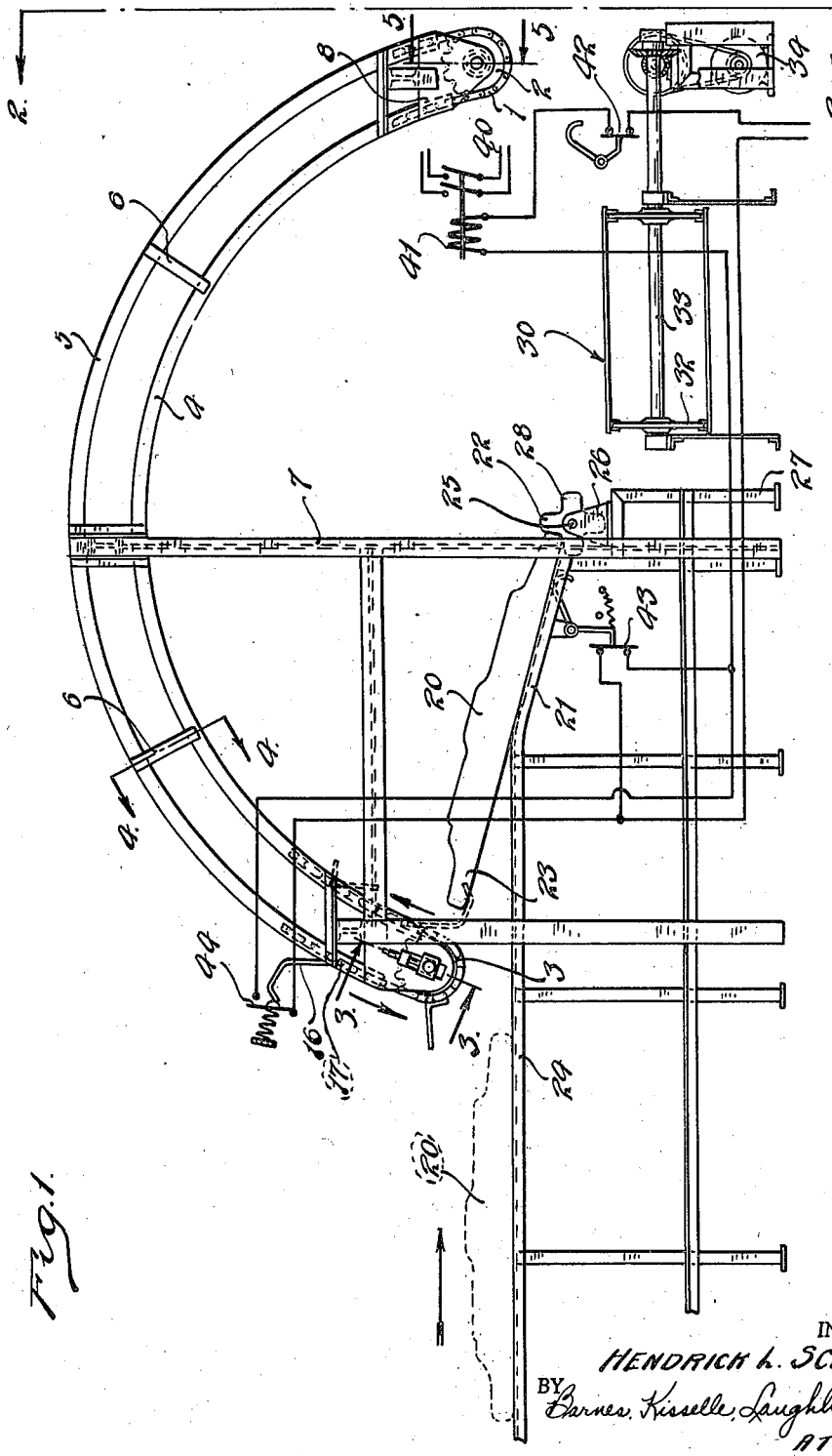
Fig. 1 is a side elevation of the turn-over device.
Figure 4:
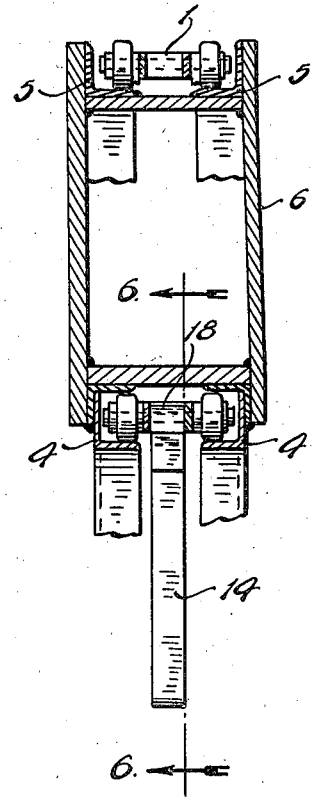
Figure 3:
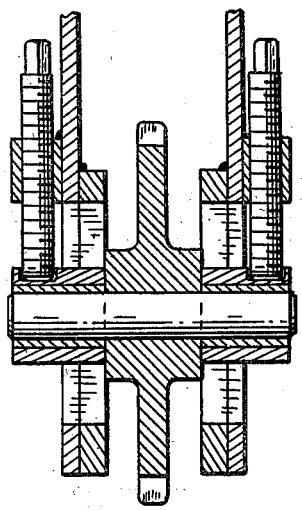
Figure 5:
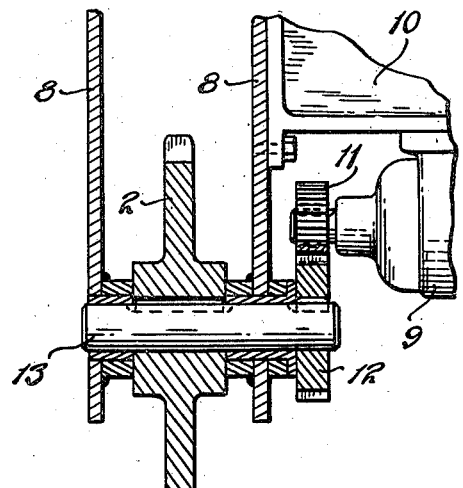

Figs. 3, 4 and 5 are sections along the lines 3—3, 4—4 and 5—5 of Fig. 1.

Figure 6:
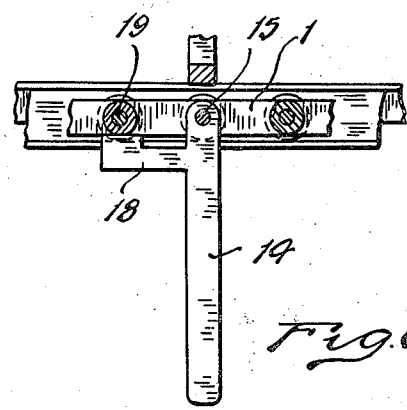

Fig. 6 is a fragmentary detail section along the line 6—6 of Fig. 4 showing the conveyor chain and one of the work handling levers.

Fig. 7 is a side elevation similar to Fig. 1 but showing the work in various stages of the turn-over operation.

Fig. 8 is a fragmentary side elevation showing the work completely turned over.

Referring more particularly to the drawings it will be seen that the turn-over device comprises an endless conveyor chain 1 which meshes with and travels about a driving sprocket 2 and an idling sprocket 3 positioned at opposite ends of an arcuate trackway having an inside track 4 and an outside track 5 along which the conveyor chain 1 travels. As shown in Fig. 4 the conveyor chain is a roller type chain and the tracks 4 and 5, along which the chain rolls, comprises arcuate angle irons fixed in spaced relation by the members 6 and supported by a steel framework generally designated 7. The sprockets 2 and 3 are each splined on a shaft journaled in a pair of plates 8 welded or otherwise fixed to the lower ends of the angle iron tracks 4 and 5. Driving sprocket 2 is driven by an electric motor 9 supported on plate 10 which is fixed to one of the plates 8. A driving gear 11 on the motor shaft meshes with a gear 12 fixed on the end of shaft 13 which supports sprocket 2.

For handling the work the conveyor chain 1 has a lever 14 pivoted thereto as at 15 and a hook member 16 pivoted thereon as at 17. The lever 14 has fixed thereto an arm 18, the outer end of which abuts or contacts the adjacent pin 19 of the chain to hold the lever 14 substantially perpendicular to the chain 1 as it travels down the inside rail 4, see Fig. 7. As shown, the lever 14 is positioned on the conveyor chain ahead of the hook 16 so that it leads the hook 16.

The work which, here for purposes of description rather than by way of limitation, is shown as a floor pan 20 of an automobile body, is fed into the turn-over device from the left of Fig. 1 on to an inclined platform 21 so that the right hand end of the floor pan abuts a rotating stop 22 and the left hand end 23 of the floor pan is raised clear of the conveyor track 24 along which the floor pan is conveyed by any suitable conveyor on to the inclined platform 21. The rotating stop member 22 is mounted on a shaft 25 journaled in the support plates 26 which are mounted on the frame member 27. Stop member 22 comprises four radial elongated arms 28 spaced ninety degrees from each other about the shaft 25. Stop 22 is preferably but not necessarily pivoted to facilitate the turning over of the work.

After being turned over, as described below, the floor pan 20 is deposited on another conveyor 30, Figs. 1 and 2. Conveyor 30 can be any suitable known conveyor but for purposes of description is shown as a chain conveyor comprising a pair of chains 31, Fig. 2, which travel about spaced sprockets. The driving sprockets 32 are shown in Figs. 1 and 2. The sprockets 32 are mounted on shaft 33 which is driven by an electric motor 34 and a set of reduction gears. The motor 34 which drives the conveyor 30 is run on an electrical circuit independently of the circuit into which the motor 9, which operates the turn-over device, is connected.

Referring to Fig. 1 it will be seen that the floor pan 20 has been deposited on the inclined platform 21 with one end against the stop 22 and the other end 23 clear of the frame 24. The turn-over chain 1 travels in the direction of the arrow. Due to the manner in which lever 14 is pivoted, it readily passes by the end 23 of floor pan 20 but hook 16, dotted line showing Fig. 1, picks up the end 23 of the floor pan and up-ends or tilts the floor pan about the stop 22 until the floor pan 20 reaches the vertical position shown in the full lines Fig. 7, whereupon gravity causes the floor pan 20 to swing to the right against lever 14 which at this time is held perpendicular to the conveyor chain 1 by the arm 18 abutting against the pin 19 of the chain. As the chain continues its movement downwardly and toward the right, Fig. 7, the floor pan is gradually lowered about the stop 22 on to the conveyor 30, Fig. 8, whereupon the lever 14 and hook 16 clear the end 23 of the floor pan, travel about the sprocket 2, and start upwardly on their return trip along tracks 5.

It is desirable that the turn-over device be automatically controlled so that the floor pans 20 will not be turned over and placed one on top of another on conveyor 30. This control is effected through the electrical circuit of motor 9. As explained above, the electrical circuit of motor 34 for conveyor 30 is controlled independently of that for motor 9. The electrical circuit for motor 9 is shown in Fig. 1. The circuit 40 into which motor 9 is connected is controlled by a solenoid switch 41 and an auxiliary circuit provided with limit switches 42, 43 and 44. Limit switch 44 is opened by hook member 16 on the return travel of the turn-over conveyor chain, Fig. 1. Limit switch 43 is normally open but is closed whenever a floor pan 20 is positioned on platform 21. Limit switch 42 is normally closed but is held open by a floor pan positioned on conveyor 30 beneath the turn-over device. Hence, as long as there is a floor pan 20 on the conveyor beneath the turn-over device, the limit switch 42 is open which deenergizes solenoid switch 41 and permits the same to be open thereby breaking the circuit 40 to motor 9. Hence, the turn-over device is shut off as long as there is a floor pan 20 on the conveyor beneath the turn-over device and thereby precludes the possibility of one floor pan being turned over on to another floor pan positioned on the conveyor.

Assuming that limit switch 42 is closed, then the placing of a floor pan 20 on the inclined platform 21 closes limit switch 43 which completes the auxiliary circuit and thereby closes solenoid switch 41 which completes the main circuit 40 and sets motor 9 and the turn-over device in operation. As soon as the conveyor chain 1 is set in operation, hook 16 clears limit switch 44 thereby permitting the same to close slightly before floor pan 20 is lifted off of platform 21 and limit switch 43 which now opens. However, the auxiliary circuit is still completed through limit switches 42 and 44 to solenoid switch 41 which keeps the main circuit to motor 9 closed and the turn-over device in operation. After the floor pan is turned over and deposited on conveyor 30, limit switch 42 is opened which, as above described, stops the motor 9. However, as soon as pan 20 clears limit switch 42, the main circuit to motor 9 is again closed and the turn-over device set in operation until the hook 16 on its return travel opens limit switch 44 to again stop motor 9 and the turn-over device from operating.

I claim:

1. A turn-over device comprising spaced upper and lower concentric arcuate trackways, an endless conveyor traveling in one direction along the lower trackway and in the opposite direction along the upper trackway, a pair of work engaging members positioned upon the conveyor, one of said members adapted to engage one end of the work to be turned when the work is positioned with its other end adjacent the center of said trackways and elevate the work to a vertical position as the members travel upwardly along the lower trackway whereupon the work falls by gravity against the other work engaging member and is lowered towards the horizontal as the members travel downwardly along the lower trackway.

2. The combination as claimed in claim 1 in which one of said work engaging members is in the form of a hook for engaging one end of the work to raise the same to vertical position and the other of said members takes the form of an arm against which the end of the work rests as it is lowered toward the horizontal.

3. The combination as claimed in claim 2 wherein the conveyor takes the form of a chain traveling along the trackways and about sprockets positioned at opposite ends of the trackway and wherein the work engaging hook and arm are pivotally mounted on the chain in spaced relation with the arm leading the hook.

4. A turn-over device comprising a fulcrum against which one end of the work to be turned over abuts, an arched trackway positioned over said fulcrum, an inclined platform adjacent the fulcrum upon which the work to be turned is positioned with the end of the work remote from the fulcrum clear of the said platform, and work engaging means adapted to travel along the arcuate trackway for engaging the end of the work remote from the fulcrum and turning the same over about the fulcrum as a center.

5. A turn-over device comprising a fulcrum member against which one end of the work to be turned over abuts, electrically driven means traveling in a path about said fulcrum for coacting with the other end of the work to turn the same over about the fulcrum as a center, and a limit switch in the circuit of the electrically driven means actuated by the work after it has been turned over to break the electrical circuit and stop the said means until the work is removed from the turn-over device.

6. A turn-over device comprising upper and lower concentric arcuate tracks positioned with their ends down, a sprocket at each end of the tracks and an endless chain traveling about said sprockets and in one direction along the lower trackway and in the opposite direction along the upper trackway, work engaging means carried by said chain adapted to engage one end of the work while traveling from one end of the lower trackway upwardly and then downwardly to the other end of the lower trackway to turn the work over, and driving mechanism including a control for operating the turn-over device, the said control being actuated by the conveyor near the end of the return travel of the conveyor for stopping the turn-over device.

7. A turn-over device comprising a fulcrum member against which one end of the work to be turned over abuts, electrically driven means traveling in a path about said fulcrum for coacting with the other end of the work to turn the same over about the fulcrum as a center, and a limit switch adjacent the said fulcrum controlling the operation of said electrically driven means, said limit switch being adapted to be closed by the work to be turned over when said work is positioned with one end against the fulcrum whereby the positioning of the work in the turn-over device preparatory to being turned acts through the limit switch to set the turn-over device in operation, a second limit switch connected in parallel with the first limit switch and adapted to be opened by the electrically driven means after the work has been turned over to break the circuit and stop the turn-over device at a predetermined point in its travel whereby the first limit switch closes to set the turn-over device in operation which closes the second limit switch to continue the operation of the turn-over device as the first limit switch opens as the work is turned over, a third limit switch connected in series with the first and second limit switch, said third limit switch being adapted to be opened by the work after it has been turned over whereby the circuit for the electrically driven means is broken and the turn-over device stopped until the work is removed from the third limit switch whereupon the circuit through the third limit switch is closed.

8. A turn-over device comprising a fulcrum against which one end of the work to be turned over abuts, an arched trackway positioned over said fulcrum with the concave side of the trackway facing said fulcrum, the said fulcrum being positioned substantially at the center of said arched trackway, a conveyer traveling along said track, a platform adjacent said fulcrum upon which the work to be turned is positioned with one end of the work abutting said fulcrum and the other end of the work adjacent said conveyer, and work engaging means mounted on the conveyer to travel therewith and adapted to engage the end of the work remote from said fulcrum for elevating the work to a vertical position about said fulcrum as the work engaging means travels upwardly along the arched trackway and for lowering the work from vertical position to substantially horizontal position as the work engaging means travels downwardly along the arched trackway whereby both the raising and lowering of said work while being turned over is at all times controlled by the same work engaging means.

HENDRICK L. SCHANSTRA.